US008167598B2

(12) United States Patent
Krämer

(10) Patent No.: US 8,167,598 B2
(45) Date of Patent: May 1, 2012

(54) FILLING SHOE FOR ROTARY TABLET PRESSES

(75) Inventor: Hans Krämer, Cologne (DE)

(73) Assignee: IMA Kilian GmbH & Co. KG, Cologne (DE)

( * ) Notice: Subject to any disclaimer, the term of this patent is extended or adjusted under 35 U.S.C. 154(b) by 190 days.

(21) Appl. No.: 12/527,752

(22) PCT Filed: Feb. 6, 2008

(86) PCT No.: PCT/EP2008/000899
§ 371 (c)(1), (2), (4) Date: Aug. 19, 2009

(87) PCT Pub. No.: WO2008/101598
PCT Pub. Date: Aug. 28, 2008

(65) Prior Publication Data

US 2010/0015264 A1 Jan. 21, 2010

(30) Foreign Application Priority Data

Feb. 21, 2007 (DE) .................... 20 2007 002 707 U

(51) Int. Cl.
*B29C 43/34* (2006.01)

(52) U.S. Cl. ...... 425/3; 425/256; 425/345; 425/DIG. 33

(58) Field of Classification Search ................ 425/3, 78, 425/256–261, 344–355, DIG. 33; 141/71
See application file for complete search history.

(56) References Cited

U.S. PATENT DOCUMENTS

| | | | | |
|---|---|---|---|---|
| 2,970,554 | A * | 2/1961 | Haupt | 425/219 |
| 3,577,842 | A * | 5/1971 | Nakai et al. | 425/3 |
| 5,213,816 | A * | 5/1993 | Smyth et al. | 425/78 |
| 5,395,227 | A | 3/1995 | Huggins, Sr. et al. | |
| 5,665,449 | A * | 9/1997 | Billarant | 428/100 |
| 5,858,415 | A * | 1/1999 | Bequette et al. | 425/78 |
| 5,942,177 | A * | 8/1999 | Banfield | 264/134 |
| 5,945,135 | A | 8/1999 | Beane et al. | |
| 2010/0015272 | A1* | 1/2010 | Matthes et al. | 425/219 |

FOREIGN PATENT DOCUMENTS

| | | |
|---|---|---|
| WO | WO 2006/081908 | 8/2006 |

OTHER PUBLICATIONS

International Search Report for PCT/EP2008/000899, Filed Feb. 6, 2008. English translation of International Preliminary Report on Patentability (Written Opinion of the International Searching Authority) dated Sep. 8, 2009 for PCT/EP2008/000899, filed Feb. 6, 2008.

* cited by examiner

*Primary Examiner* — Richard Crispino
*Assistant Examiner* — Thukhanh Nguyen
(74) *Attorney, Agent, or Firm* — Rankin, Hill & Clark LLP

(57) ABSTRACT

A filling shoe for rotary tablet presses, comprising a filling shoe housing with at least one discharge opening for a starting product which is to be compressed and with a seal for sealing the gap between the die plate and filling shoe housing, which seal can be fastened exchangeably to a bottom wall of the filling shoe housing. In order to make it possible to achieve shorter downtimes when changing the seals, the seal in the mounted state is fastened to the bottom wall by means of magnetic force. Changing the seal can then take place, if appropriate even without any further aids, by overcoming the magnetic holding force and replacing the seal with a new seal. The invention also relates to the seal for sealing the gap, which seal can be fastened according to the invention by means of magnetic elements.

19 Claims, 2 Drawing Sheets

FILLING SHOE FOR ROTARY TABLET PRESSES

This application claims priority to and the benefit of the filing date of International Application No. PCT/EP2008/000899, filed Feb. 6, 2008, which application claims priority to and the benefit of the filing date of German Application No. 20 2007 002707.9, filed Feb. 21, 2007, both of which are hereby incorporated by reference into the specification of this application.

The invention relates to a filling shoe for rotary tablet presses, and, more particular, to a filling shoe including a filling shoe housing, which can be positioned above a die plate of a rotor of the rotary tablet press, with at least one discharge opening for a starting product which is to be compressed and with a seal for sealing the gap between the rotatable die plate and the filling shoe housing, which seal is fastened or can be fastened exchangeably to a bottom wall of the filling shoe housing that contains the discharge opening. The invention also relates to the seal for sealing the gap.

BACKGROUND

In the rotary tablet presses used in the prior art, the product which is to be compressed, such as, in particular, a powder for the production of medicaments or a powder for the production of cleaning tablets or the like, is fed, via suitable channels or hoses, a hopper and a feed member, referred to as a filling shoe, to the dies which are interchangeably inserted in the die plate, with the fed-in powder being pressed with the holes of said dies to form a tablet of the desired shape by means of punches moved in opposite directions. The hopper and the channels can also form an integral component of the filling shoe. Here, the filling shoe can be mounted in a fixed position relative to the die plate or else be fastened to a pivoting device which in the course of operation is pivoted into its operating position in which the filling shoe assumes a predetermined position relative to the dies in the die plate. Impeller wheels or other movable distribution members which are motor-driven are frequently arranged inside the filling shoe so that the product or powder which is to be compressed can be better distributed over the die holes which are to be filled by means of the filling shoe. The filling shoe should at the same time ensure that the product to be compressed, such as, in particular, powder, substantially only fills the die hole to the desired filling height in order to avoid product losses and to achieve a favorable metering accuracy of the product or powder to be compressed. For this purpose, a seal which is made of a material which is optimally tailored to the product to be compressed is fastened to the underside of a bottom wall of the filling shoe housing that surrounds the discharge opening. Customary materials for such seals can be, for example, bronze, stainless steel or plastic and, depending on the product to be compressed that is used, the intended purpose, the wear resistance of the seal, etc., the seal must be exchanged for a new seal or else for a seal made of another material when the product to be tableted is changed.

The process of changing or exchanging the seals in the prior art involves loosening a large number of screws which engage through the bottom wall of the filling shoe housing and pass into associated threaded holes in the seal. It is also known practice to insert seals made of bronze, for example, into suitable dovetail guides or the like by means of a rib and to anchor them therein in a positively locking manner. The more abrasive the product to be compressed and the smaller the free gap is set between the seal and the surface of the die plate, the quicker the seal wears and a change of seal on the filling shoe must take place, which change requires relatively long downtimes of the tablet press. Since powder dust which is to be briquetted, for example, clogs the threaded holes or undercut guides, even changing the seal can present problems and cause relatively long downtimes.

SUMMARY OF INVENTION

In accordance with the present invention, provided is an improved filling shoe which makes it possible to achieve shorter downtimes when changing the seals.

According to one aspect of the invention, the seal in the mounted state is fastened to the bottom wall by means of magnetic force. If a change of seal is required in the filling shoe according to an aspect of the invention, it is possible, if appropriate even without any further aids, for the seal to be released by overcoming the magnetic holding force and then to be replaced with a new seal positioned at the same place. For this purpose, the seal could in principle be made of magnetized material, in particular of suitable material for high-energy magnets (supermagnets). For the purpose of fastening seals made of steel or stainless steel, the bottom wall could also be made of magnetized material, in particular of material for high-energy magnets (supermagnets) or comprise insert pieces or the like made of suitable magnetized material.

The use of magnetic force, in particular the magnetic force of high-energy magnets, as a holding force for the seal has the particular advantage that it is possible to dispense with providing through holes or screw holes in the bottom wall of the filling shoe housing and in the seal. This not only eliminates weakened areas or minimized areas of, for example, the cross section of the body of the seal, at which areas the seal body may otherwise be subjected to wear or breakages, possibly even after a short time, but, given the fact that no cavities or holes have to be provided in the bottom wall and in the seal, also minimizes the number of cavities and the like which form undesired dead spaces in which constituents of the product to be compressed, in particular dust, powder bodies or the like, can accumulate and which require a complicated cleaning process during a change of product. Since holes for mounting the screws or slot-like guides for positively anchoring the seals are dispensed with, the risk of corresponding cavities being clogged with the product to be compressed, a situation which could make releasing and changing the seal more difficult, is minimized at the same time.

According to another aspect of the invention, the magnetic elements can be secured to the seal and/or to the bottom wall, with it being particularly advantageous if, to apply the magnetic force, the magnetic elements are secured in pairs both to the seal and to the bottom wall of the filling shoe housing. The use of pairs of magnetic elements makes it possible to achieve higher holding forces since the attraction force or the magnetic field of both magnetic elements can then be used to apply the magnetic holding force. In particular, the magnetic elements mounted, formed or secured on the seals may be elements of flat design, such as flat disks, flat cylinders or parallelepipeds, and/or be embodied as high-energy magnets. The magnetic elements which are used may particularly be high-energy magnets which have an energy product of at least 150 KJ/m$^3$, in particular at least 200 KJ/m$^3$, preferably at least approximately 250 KJ/m$^3$. Here, the corresponding high-energy magnets or supermagnets may particularly advantageously be made of hard ferrites, neodymium-iron-boron (NdFeB), samarium-cobalt (SmCO) or other suitable materials, for example of the rare earth metals. The use of high-energy magnets made, for example, of NdFeB having an energy product of approximately 250 $KJ/m^3$ means that only a few magnets or pairs of magnets are sufficient to reliably apply the required holding forces.

According to yet another aspect of the invention, at least two magnetic elements, a magnetic element pair or a plurality of magnetic element pairs form a centering means for exactly positioning the seal relative to the discharge opening. Here, in the simplest embodiment, at least two magnetic elements can be secured so as to project beyond the bottom wall of the filling shoe housing or beyond the upper side of the seal so that, by positively engaging in a depression in the counterpart, i.e. in the seal or in the bottom wall, the seal can be fixed in position. The countermagnet of the pair that may be present can then be arranged set back from the surface. The magnetic elements can be secured on the seal and/or in the bottom wall particularly by firmly adhesively bonding the magnets or pressing the magnets into corresponding receptacles. Alternatively, the magnetic elements or high-energy magnets can also be formed by means of curable and/or plastic-bonded, magnetizable materials or the like. The centering function could then be performed, if appropriate, also by centering pins or the like which are provided in addition to the magnets which define the holding force. The centering pins which may be additionally provided or the magnets which perform a centering function can at the same time also absorb some of the shear forces which inevitably occur in a rotating die plate during operation and which act on the seal in the peripheral direction or direction of rotation. In addition to the magnetic holding forces, the shear forces can be absorbed in particular through a positive connection between the magnet or centering pin and the bottom wall. Alternatively or in addition, it would be possible in particular for a transition curve or the like of the seal situated transversely to the direction of rotation to bear against a projection or a rib on the bottom wall so that the seal is additionally secured against release by the projections or ribs. Depending on the product used, the individual magnets can be designed to be additionally galvanized, coated, encapsulated in a food-resistant manner, or the like.

According to a further aspect of the invention, some seals may feature a web which engages through the discharge opening and which at the same time particularly advantageously forms a removal aid for better gripping the seal to be released. Particularly in the case of embodiments of seals which bear flush against the underside of the bottom wall of the filling shoe housing, it may be advantageous for the seal or the bottom wall to be provided with at least one wedge bevel for the application of a removal aid.

A sealing element according to the invention for a filling shoe for rotary tablet presses improves the function of the filling shoe in that the seal is made of magnetized material, in particular of material for high-energy magnets, or in that magnetic elements, in particular magnetic elements made of material for high-energy magnets, are secured to the seal. In the case of the sealing elements or seals, too, at least one magnetic element secured to the seal can advantageously be fastened in a projecting manner so that this magnetic element can be used at the same time to center or position the seal relative to the discharge opening.

Further refinements of a filling shoe according to the invention having a seal according to the invention will become apparent from the description given below of an exemplary embodiment which is schematically illustrated in the drawing.

These and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF EMBODIMENTS

Figure 1:
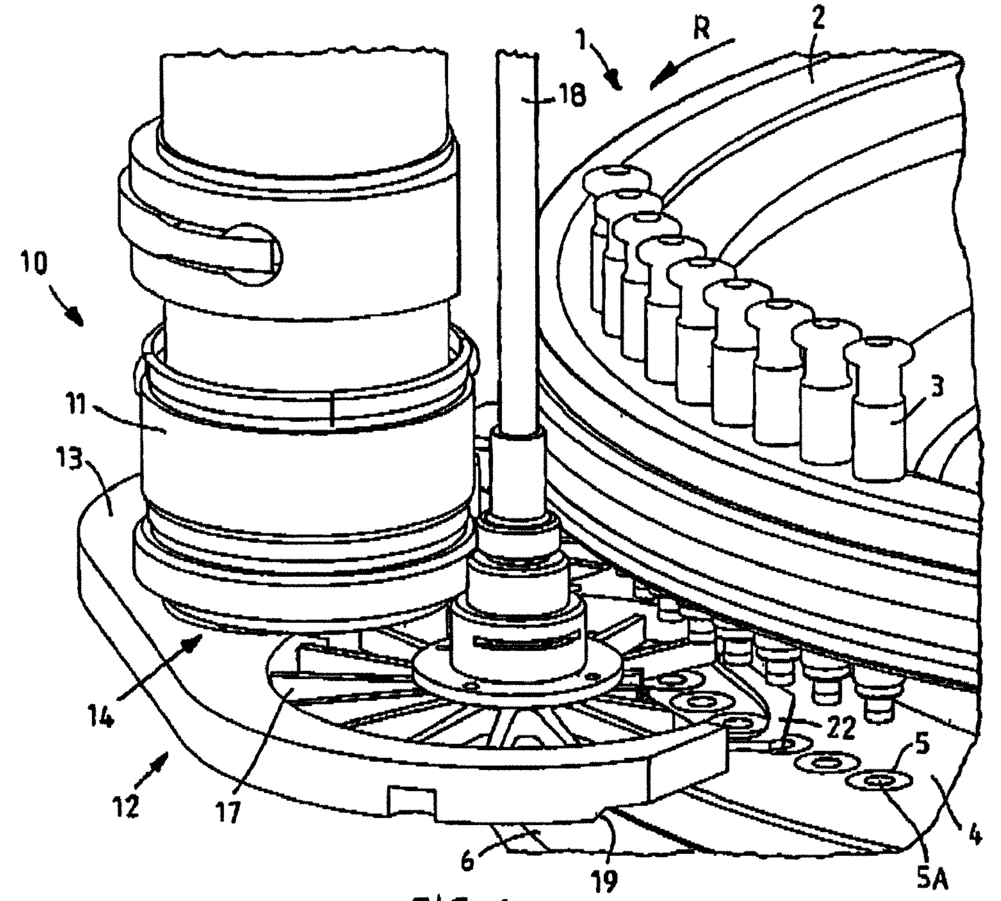
FIG. 1 is a perspective view of a portion of a rotor and of a filling shoe, partially cut away.
Figure 2:
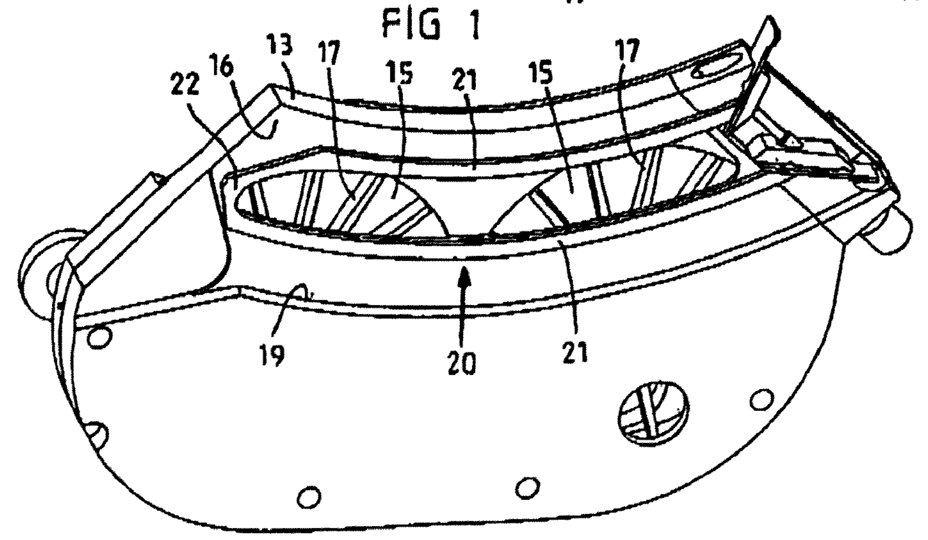
FIG. 2 is a view of the underside of the filling shoe housing from FIG. 1 with a fastened seal.
Figure 3:
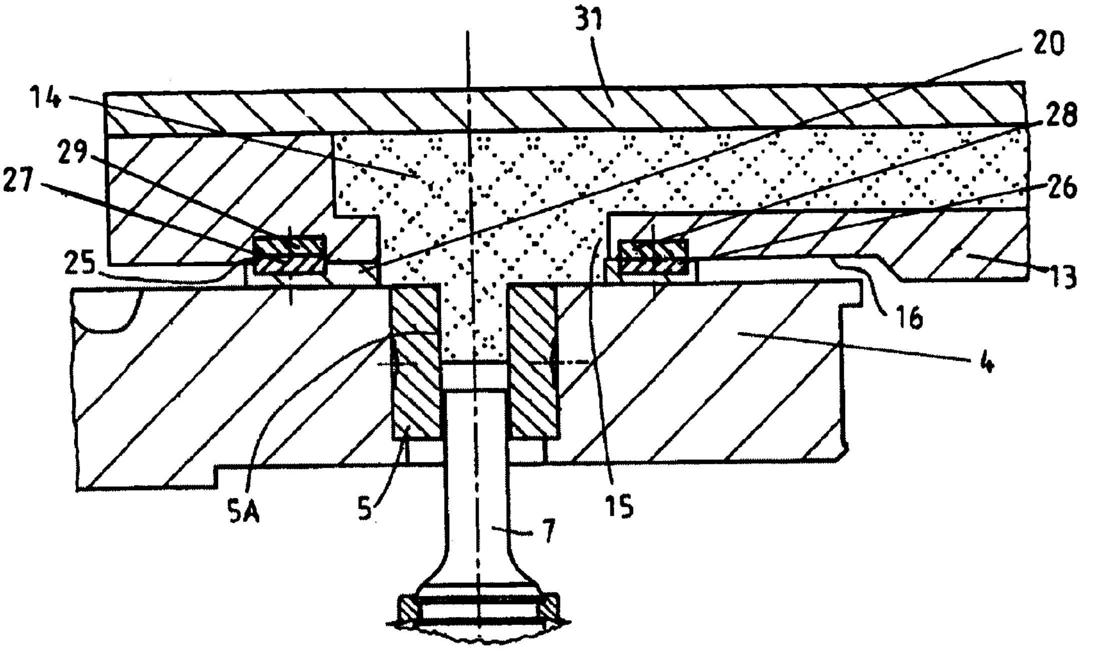
FIG. 3 is a vertical section through the die plate and filling shoe which schematically shows the fastening of a seal using a plurality of magnetic elements.

Referring now to the drawings wherein the showings are for the purpose of illustrating preferred and alternative embodiments of the invention only and not for the purpose of limiting same, FIG. 1 shows a rotor of a rotary tablet press 1, which is not shown in further detail. In a manner known per se, rotor 1 has an upper-punch guide ring 2 in which a plurality of upper punches 3 are guided in a vertically movable manner in suitable guides. The rotor also comprises a die plate 4 with a number of dies 5 corresponding to the number of punches, in which dies the punches press a product which is to be compressed, such as, in particular, powder, to form a tablet, and additionally a lower-punch guide ring 6 (only slightly indicated) in which, for each upper punch 3, an associated lower punch 7 shown only in FIG. 3 is guided in a height-adjustable manner. Depending on the size of the tablet to be pressed and the size of the rotary tablet press, the number of punches 3, 7 for each punch guide ring 2, 6 and the number of dies 5 can vary between usually about 15 and up to 100, and corresponding rotary tablet presses can be used to produce tablets from a product to be compressed or else from a plurality of products to be compressed, such as, for example, multiphase pharmaceutical tablets or cleaning tablets. In order to press tablets from a powder which is fed in, the rotor 1 is rotated in the direction of rotation R and the punches are moved up and down by means of suitable slotted guide tracks or curved guide tracks so that, depending on the position of the dies and punches 3, 7, the dies 5 can be filled with the product to be compressed, the tablet can be pressed or the pressed tablet can be ejected.

To fill the dies during operation, a rotary tablet press comprises at least one filling shoe 10 which is fixedly assigned to the rotor 1 and to which the product to be compressed, such as, in particular, powder, is fed via a hopper (not shown) and suitable feed channels and feed tubes 11 leading to a filling shoe housing 12. The filling shoe housing 12 here comprises a solid plate constituting a bottom wall 13 which is provided centrally with an approximately figure-eight-shaped distribution cutout 14 which opens into a continuous or, if appropriate multiply subdivided, discharge opening 15 on the underside 16 of the bottom wall 13. Rotatably arranged within the distribution cutout 14 here are two impeller wheels 17 as distribution members which are driven via drive shafts 18 which lead, inside or outside the filling shoe housing 12, to a motor drive so that the impeller wheel 17 can be rotated in the course of operation to move and distribute the product to be compressed.

The filling shoe 10 can either be fixedly mounted inside the rotary tablet press or it can be articulated on a pivoting arm or the like in order, for the operation of the rotary tablet press, to pivot the filling shoe 10 into an operating position in such a way that the discharge openings 15 in a portion of the rotary tablet press lie directly above a plurality of dies 5 to be filled. The dies 5 in the die plate 4 are moved past the discharge openings 15 in the filling shoe 10 for a time span dependent on the speed of rotation of the rotor 1 and must be optimally and completely filled with the product to be compressed within this usually extremely short time span. In the exemplary embodiment shown, the underside 16 of the bottom wall 13 of the filling shoe housing 12 is provided with a step 19 whose radius of curvature substantially corresponds to the outside diameter of the die plate 4 in order that the filling shoe 10 can be positioned with the smallest possible radial and axial distance from the die plate 4.

For optimum operation of a rotary tablet press, the die holes 5A in the dies 5 should be filled as exactly as possible, and it should be ensured at the same time that, behind the filling shoe 10 in the direction of rotation R, as far as possible no product to be compressed projects beyond the upper edge of the dies 5 in the die plate 4 or is conveyed out of the discharge opening 15. This is achieved in a manner known per se by means of a sealing segment as seal 20 which is open on one side here in the direction of rotation, said seal extending in the form of a circular arc around the discharge opening 15 by way of two segment legs 21 and having a transition curve 22 which connects the two segment legs 21 in such a way that, at the transition curve 22 at the latest, the product to be compressed is stripped off relative to the upper side of the die plate 4 by means of the transition curve 22. At its end situated opposite the transition curve 22, the seal 20 is open between the two segment legs 21. The seal 20 is releasably fastened to the underside 16 of the bottom wall 13 so that, depending on the product to be compressed, it has to be exchanged for a new seal 20 at longer or shorter intervals. The seal 20 needs to be exchanged regularly even when it is made of VA steel or bronze, for example, since at any rate when abrasive powder is used as the product to be compressed, the inner edge situated in the region of the transition curve 22 and facing the discharge opening 15 is subjected relatively quickly to wear which diminishes or cancels out the stripping function of the seal 20.

The operating position of the, in this case rigid, sealing segment forming the seal 20 according to the invention relative to the die plate 4 is shown particularly clearly in FIG. 3, to which reference is now made. Between the underside 16 of the bottom wall 13 and the surface of the die plate 4 is a relatively large gap which is substantially completely bridged by means of the seal 20 fastened to the underside 16. In order to keep the wear of the seal 20 reasonably small and to be able at the same time to use relatively stable materials for the seal 20, there nevertheless usually remains a gap clearance in the region of about 1/10 mm between the lower surface of the seal 20 and the facing surface of the die plate 4.

In one embodiment, the seal 20 in the filling shoe 10 according to the invention is fastened to the underside 16 of the bottom wall 13 by means of magnetic force alone. In this embodiment, the magnetic holding force between the seal 20 and the bottom wall 13 is applied using respective pairs of magnetic elements 26 and 28, with the magnetic elements 26 being arranged and secured on the upper side of the sealing segment 20 and the magnetic elements 28 being arranged and secured on the underside 16 of the bottom wall 13. The magnetic elements 26, 28 can be secured in particular by adhesively bonding them in place or pressing them into place, and the magnetic elements 26, 28 are preferably flat and at the same time relatively wide high-energy magnets, such as, for example, so-called supermagnets made of hard ferrite or neodymium-iron-boron (NdFeB). Distributing a plurality of pairs of magnetic elements 26, 28 along the segment legs 21 of the seal 20 and if appropriate also along the transition curve 22 and, correspondingly, along the opposite surface on the underside 16 of the bottom wall 13 makes it possible to ensure that the holding forces applied by means of the magnetic elements 26, 28 are reliable enough to prevent the seal 20 from coming loose in spite of the frictional forces which occur during operation as a result of the powder stripped off at the transition curve 22. The powder to be compressed that is distributed over the dies by means of the filling shoe is indicated in FIG. 3 within the distribution chamber 14 and the discharge opening 15 and also the die hole 5A. In order at the same time to ensure that, when mounting a new seal 20, it is fastened exactly in the desired position and orientation to the underside 16 of the bottom wall 13, one or preferably more pairs of magnetic elements can at the same time be used to provide centering means, as is indicated for the magnetic elements 27 and 29 in the left half of FIG. 3. In the exemplary embodiment represented, the centering takes place in such a way that the magnetic element 27 secured to the upper side of the seal 20 projects beyond the upper side and, at the same time, the magnetic element 29 secured in the bottom wall 13 is set back with respect to the underside 16, thereby allowing the magnetic element 27 to fit positively into a recess 25 on the underside 16 and in so doing to center the seal 20. More advantageously, a plurality of magnetic element pairs simultaneously form a centering or positioning means. The centering or positioning means could also be designed or arranged in such a way that they can also be used to absorb shear forces in the direction of rotation of the rotor.

Numerous modifications which are intended to come within the scope of protection of the appended claims will be apparent to a person skilled in the art from the foregoing description. The fastening of seals using magnetic force, in particular using the magnetic force of high-energy magnets, can be substantially achieved with any design of seal or sealing segments, and the seals could also, for example, form closed rings, have a multi-part design or be provided in other formats. In the case of multi-part seals, the transition curve in particular can be designed as a partial segment which can be exchanged separately from other partial segments of the seal, since the greatest wear normally occurs on the transition curve. The seals are preferably made of copper, stainless steel or bronze; however, it would also be possible to secure corresponding high-energy magnets to seals made of plastic or other materials. Furthermore, it would also be possible, for example, to form the entire sealing segment from a magnetized material, in particular from a material for high-energy magnets, with the result that the sealing segment 20 is therefore fastened self-adhesively to the underside of the bottom wall 13. Here too, it would be possible to increase the adhesive force by fastening, partially or peripherally, at least one further high-energy magnet or the like to the bottom wall of the filling shoe. The magnetic element or high-energy magnets can also be pressed directly into recesses or the like in the sealing segment and/or the bottom wall of the filling shoe housing and/or also be made, for example, of plastic-bonded magnetic materials based on NdFeB or based on hard ferrite, of sintered hard ferrites, or other sintered or plastic-bonded materials, rare earth materials or the like having high-energy magnetic properties. As a departure from the exemplary embodiment represented, the die plate may have a different construction and be composed, for example, of subsections having integral die holes or have cutouts for insert pieces which comprise a plurality of die holes.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A filling shoe for rotary tablet presses, comprising a filling shoe housing, which can be positioned above a die plate of a rotor of the rotary tablet press, with at least one discharge opening for a starting product which is to be compressed and with a seal for sealing the gap between the die plate and the filling shoe housing, which seal is fastened or can be fastened exchangeably to a bottom wall of the filling shoe housing that contains the discharge opening, the seal in the mounted state is releasably and replaceably fastened to the bottom wall by means of magnetic holding force of magnetized material containing a rare-earth material, the seal is made of the magnetized material and the magnetized material has an energy product of at least 150 $KJ/m^3$.

2. The filling shoe as claimed in claim 1, wherein the bottom wall is made at least partially of the magnetized material.

3. The filling shoe as claimed in claim 1, wherein the magnetic force means includes magnetic elements secured to at least one of the seal and the bottom wall.

4. A filling shoe for rotary tablet presses, comprising a filling shoe housing, which can be positioned above a die plate of a rotor of the rotary tablet press, with at least one discharge opening for a starting product which is to be compressed and with a seal for sealing the gap between the die plate and the filling shoe housing, which seal is fastened or can be fastened exchangeably to a bottom wall of the filling shoe housing that contains the discharge opening, the seal in the mounted state is releasably and replaceably fastened to the bottom wall by means of magnetic holding force of magnetized material containing a rare-earth material, the magnetic force means includes magnetic elements secured to at least one of the seal and the bottom wall, the magnetic elements are secured in pairs including corresponding elements on both the seal and the bottom wall, and the magnetic elements each have an energy product of at least 150 $KJ/m^3$.

5. A filling shoe for rotary tablet presses, comprising a filling shoe housing, which can be positioned above a die plate of a rotor of the rotary tablet press, with at least one discharge opening for a starting product which is to be compressed and with a seal for sealing the gap between the die plate and the filling shoe housing, which seal is fastened or can be fastened exchangeably to a bottom wall of the filling shoe housing that contains the discharge opening, the seal in the mounted state is releasably and replaceably fastened to the bottom wall by means of magnetic holding force, the magnetic force means has an energy product of at least 150 $KJ/m^3$.

6. The filling shoe as claimed in claim 5, wherein the magnetic force means has an energy product of at least 200 $KJ/m^3$.

7. The filling shoe as claimed in claim 5, wherein the magnetic force means has an energy product of at least 250 $KJ/m^3$.

8. The filling shoe as claimed in claim 5, wherein the magnetic force means include at least one of neodymium-iron-boron (NdFeB), hard ferrite and samarium-cobalt (SmCO).

9. A filling shoe for rotary tablet presses, comprising a filling shoe housing, which can be positioned above a die plate of a rotor of the rotary tablet press, with at least one discharge opening for a starting product which is to be compressed and with a seal for sealing the gap between the die plate and the filling shoe housing, which seal is fastened or can be fastened exchangeably to a bottom wall of the filling shoe housing that contains the discharge opening, the seal in the mounted state is releasably and replaceably fastened to the bottom wall by means of magnetic holding force, the magnetic force means includes a centering means for exactly positioning the seal relative to the discharge opening.

10. The filling shoe as claimed in claim 9, wherein the centering means includes at least two magnetic elements positioned on at least one of the seal and the bottom surface.

11. The filling shoe as claimed in claim 10, wherein the magnetic elements secured to the bottom wall project beyond at least one of the bottom wall of the filling shoe housing and the upper side of the seal.

12. The filling shoe as claimed in claim 5, wherein the magnetic force means includes magnetic elements secured to at least one of the seal and the bottom wall, the magnetic elements secured to the bottom wall project beyond at least one of the bottom wall of the filling shoe housing and the upper side of the seal.

13. The filling shoe as claimed in claim 5, further including at least one removal aid.

14. The filling shoe as claimed in claim 13, wherein the at least one removal aid includes a wedge bevel formed on the outer periphery of the seal.

15. A seal for a filling shoe for rotary tablet presses, which seal can be fastened to the underside of a bottom wall of a filling shoe housing, the seal including at least one of a magnetized material and magnetic elements, wherein the at least one of the magnetized material and the magnetic elements contains a rare-earth material or is formed at least in part by a magnetized material having an energy product of at least 150 $KJ/m^3$.

16. A seal arrangement for a filling shoe for rotary tablet presses, the filling shoe having a filling shoe housing with a bottom wall and a discharge opening in the bottom wall which are positionable above a die plate of a rotor of the rotary tablet press, in operation, the bottom wall and the discharge opening being spaced from the die plate forming a gap, the seal arrangement at least partially sealing the gap, the seal arrangement comprising a seal body having a first segment leg and a second segment leg with a transition leg joining the first and second segment legs, the seal body further including a top side engaging the bottom wall of the filling shoe housing and a bottom side facing the die plate, the seal body being magnetically attracted by means of magnetic holding force of magnetized material containing a rare-earth material or having an energy product of at least 150 $KJ/m^3$ to the bottom side to at least partially releasably and replaceably maintain the seal body relative to the bottom side during the operation of an associated filling shoe.

17. The seal arrangement as claimed in claim 16, wherein the seal body includes at least one magnetic element containing the rare-earth material or being formed at least on part by the magnetized material having an energy product of at least 150 $KJ/m^3$.

18. The seal arrangement as claimed in claim 17, wherein the at least one magnetic element is a seal body magnetic element and the seal arrangement further includes a corresponding bottom side magnetic element on the bottom side of filling shoe housing.

19. The seal arrangement as claimed in claim 18, wherein at least one of the seal body magnetic element and the bottom side magnetic element are positioned in a magnetic element recess.

* * * * *